(12) United States Patent
Castellanos et al.

(10) Patent No.: US 6,978,275 B2
(45) Date of Patent: Dec. 20, 2005

(54) METHOD AND SYSTEM FOR MINING A DOCUMENT CONTAINING DIRTY TEXT

(75) Inventors: Maria Castellanos, Sunnyvale, CA (US); James R. Stinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 473 days.

(21) Appl. No.: 09/944,919

(22) Filed: Aug. 31, 2001

(65) Prior Publication Data

US 2003/0046263 A1   Mar. 6, 2003

(51) Int. Cl.[7] ............................................. G06F 17/30
(52) U.S. Cl. ......................................... 707/102; 707/2
(58) Field of Search ................................ 707/6, 102, 2

(56) References Cited

U.S. PATENT DOCUMENTS

| | | | | |
|---|---|---|---|---|
| 4,839,853 A | * | 6/1989 | Deerwester et al. | 707/5 |
| 4,965,763 A | * | 10/1990 | Zamora | 704/1 |
| 5,754,938 A | * | 5/1998 | Herz et al. | 725/116 |
| 5,857,179 A | * | 1/1999 | Vaithyanathan et al. | 707/2 |
| 6,085,206 A | * | 7/2000 | Domini et al. | 715/533 |
| 6,199,034 B1 | * | 3/2001 | Wical | 704/9 |
| 6,308,172 B1 | * | 10/2001 | Agrawal et al. | 707/5 |
| 6,332,138 B1 | * | 12/2001 | Hull et al. | 707/5 |
| 6,374,241 B1 | * | 4/2002 | Lamburt et al. | 707/6 |
| 6,442,545 B1 | * | 8/2002 | Feldman et al. | 707/6 |
| 6,446,061 B1 | * | 9/2002 | Doerre et al. | 707/3 |
| 6,539,376 B1 | * | 3/2003 | Sundaresan et al. | 707/5 |
| 6,567,789 B1 | * | 5/2003 | Baker | 705/31 |
| 2002/0103834 A1 | * | 8/2002 | Thompson et al. | 707/526 |
| 2002/0138528 A1 | * | 9/2002 | Gong et al. | 707/530 |
| 2002/0169788 A1 | * | 11/2002 | Lee et al. | 707/104.1 |
| 2002/0178002 A1 | * | 11/2002 | Boguraev et al. | 704/235 |

\* cited by examiner

*Primary Examiner*—Wayne Amsbury

(57) ABSTRACT

A method and system for mining a document containing dirty text. Dirty text is removed or replaced and the document is processed using a variety of text mining techniques. In one embodiment, dirty text removal and replacement occurs in two stages. In the first stage, a general cleaning occurs on all documents without regard to what domain they belong to or the mining task to be performed. In the second stage, document cleaning is more specific to the anomalies of the domain and the mining task to be performed. In the third stage, the document is processed using a variety of data mining techniques according to the mining task. In one embodiment, the present invention scores and ranks sentences in a document according to their relevance, extracts the highest ranked sentences, and presents a summary. The present invention allows users to leverage existing domain knowledge and can be customized according the domain and task requirements.

26 Claims, 5 Drawing Sheets

METHOD AND SYSTEM FOR MINING A DOCUMENT CONTAINING DIRTY TEXT

BACKGROUND OF THE INVENTION

The present invention relates to the field of data mining. More particularly, the present invention pertains to a method and system for mining a document containing dirty text.

PRIOR ART

Demand for business data has risen as data processing capabilities have grown. More than ever, knowledge can be a critical advantage to success, just as lack of it can be a critical disadvantage. Companies with superior business knowledge have dramatically reduced costs, increased revenues, and enhanced profitability. These demands, as well as the requirements to shorten time to market, react to competitive threats, expand market share, and improve customer service, are driving the decision to collect and analyze business data.

Text mining is a technology for analyzing business data that focuses on extracting content from a document or a collection of documents. Extracting content has been increasingly recognized as an important area of research and application during the last few years due to the overwhelming volume of on-line text available on the Internet. Additional sources of information include E-mails, memos, customer correspondence, and reports. Extracting relevant data from such diverse sources can potentially provide a company with a substantial business advantage.

A variety of text mining techniques are available which can be used to mine the document collection depending on the intended outcome. For example, categorization technologies focus on organizing documents into categories, thus facilitating user navigation through large sets of documents. Categorization techniques group sets of documents according to shared attributes. Clustering is a categorization technique used to discover categories from a collection of documents according to their similarities. Classification is another categorization technique which applies to document collections when the categories are predefined. Classification techniques learn a model for each category which explains the principles governing the assignment of documents in the collection. Subsequently added documents can then be automatically incorporated into the existing structure of the document collection.

Other text mining technologies like information extraction and summarization focus on extracting pieces of information from each document. Summarization describes the main ideas of a document while reducing the amount of text a user must read. A summarizer extracts the most relevant portions of a document and presents them in a summary to the user. The need for document abstraction mechanisms has poised summarization as one of the most important areas in applied natural language processing and text mining.

Existing techniques, prototypes, and products for summarizing are designed to work with documents that contain clean, grammatically correct, and narrative text. In real world applications however, documents frequently contain anomalies. Misspellings, typographical errors, joined words, and ad hoc abbreviations are commonly found in text. Furthermore, domain specific anomalies may be present as well, like cryptic tables, programming code, and core dumps. All these anomalies are collectively known as "dirty text" and if they are not appropriately dealt with, they can skew the data set and alter the outcome of text mining operations in general, and in particular, summarization. In order to extract content accurately, most dirty text must be identified and normalized or even removed prior to performing any mining operations. Other anomalies such as bad grammar, even if not solved, need to be addressed since they limit the range of applicable techniques. For example, natural language processing is not applicable when summarizing dirty text. Furthermore, existing summarizers in general do not take advantage of existing domain knowledge which can be very useful in improving the quality of the summaries. Those that do take advantage of existing domain knowledge do it in a very limited way and are difficult to customize.

Accordingly, the need exists for a method and system for mining text documents containing dirty text such as typographical errors, misspellings, joined words, and ad hoc abbreviations as well as bad grammar, cryptic tables, programming code, core dumps, missing or ambiguous punctuation, and haphazard capitalization. A need further exists for a method and system for mining a document containing dirty text that can be easily customized and that takes advantage of existing domain knowledge.

SUMMARY OF THE INVENTION

The present invention provides a method and system to mine text documents containing dirty text such as typographical errors, misspellings, joined words, and ad hoc abbreviations as well as bad grammar, cryptic tables, programming code, core dumps, missing or ambiguous punctuation, and haphazard capitalization. Other than bad grammar, dirty text is removed or replaced and the document is processed using a variety of text mining techniques. The present invention can be easily customized and takes advantage of existing domain knowledge.

In one embodiment, the removal and replacement of dirty text is divided into two stages. In the first stage, a general cleaning occurs which will take place on all documents without regard to what domain they belong to. A thesaurus assistant assists in creating a domain specific thesaurus. An editor then replaces misspelled words and phrases, ad hoc abbreviations, and joined words with their standard counterparts in the thesaurus. In the second stage, the cleaning of documents is more specific to the anomalies specific to the domain of the document as well as the mining task. For example, non sentence-like text such as computer code, and core dumps is removed, either temporarily or permanently, to facilitate later steps like feature selection and sentence identification. The document is then processed using a variety of data mining techniques to derive relevant information. In one embodiment, sentence summarization, in which the sentence boundaries are identified and the resulting sentences are scored and ranked according to their relevance, is performed and the highest ranked sentences are extracted from the documents. The present invention allows a user to leverage existing domain knowledge and can be easily customized according to the domain and task requirements.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

A method of preparing and mining text documents containing dirty text is described. While numerous details are set forth in order to provide a thorough understanding of the present invention, it should be understood that it is not intended to limit the invention to this particular embodiment alone. On the contrary, the invention is intended to cover alternatives, modifications and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
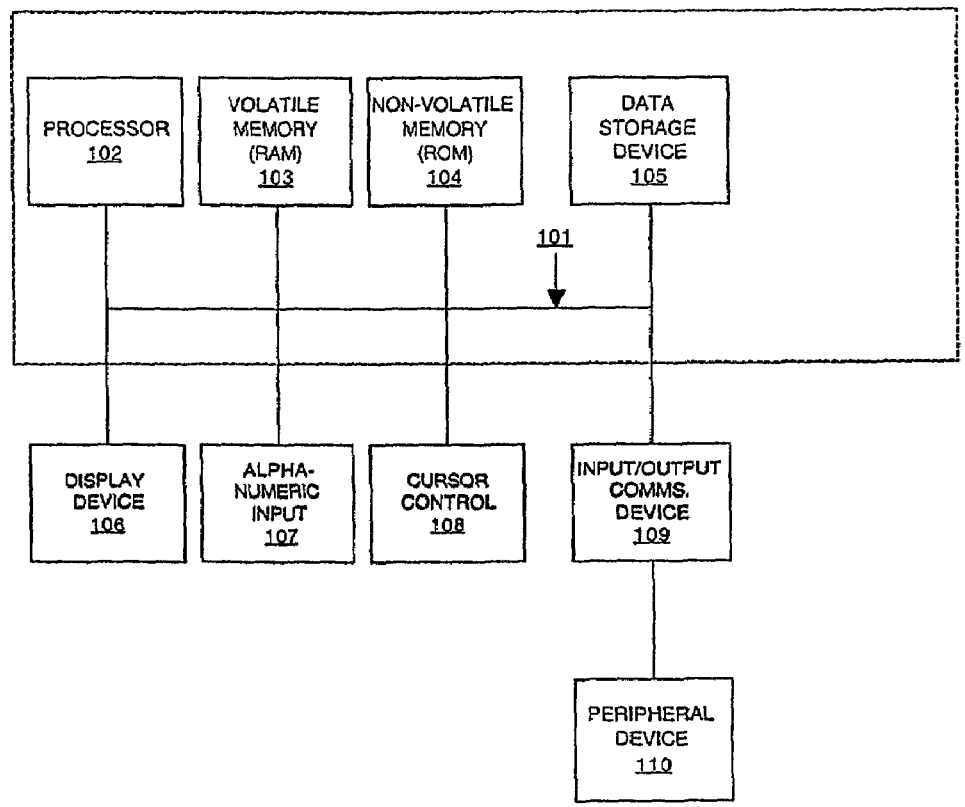
FIG. 1 is a block diagram of an exemplary computer system upon which embodiments of the present invention may be performed.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing vast amounts of data. It should be noted that the software program for performing the method of the present invention can be stored either in volatile memory 103, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed an/or activated via input from alpha-numeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks (e.g., "creating," "processing," "comparing," "removing," "processing," "outputting," "evaluating," "ranking," and "presenting" etc.). In particular, computer system 100 can be coupled in a system for mining a document containing dirty text.

The present invention is a method and system for mining a document containing dirty text. Some kinds of dirty text are removed or replaced and the document is mined using a variety of text mining techniques, limited by some anomalies that cannot be corrected such as bad grammar. In one embodiment, the removal and replacement of dirty text is divided into two stages. In the first stage, a general cleaning takes place. This general cleaning will take place on all documents without regard to either the domain they belong to or the mining task that will be performed. In the second stage, domain and task specific cleaning takes place. The cleaning of documents at this stage is more specific to the anomalies specific to the domain and to the task to be accomplished. In the third stage, the document is mined using a variety of data mining techniques according to the mining task. In other words, a given text mining technique used in the third stage is regarded as a component which is selected according to what data mining operation is to be performed.

In one embodiment of the present invention, the mining of documents comprises summarization. In other embodiments, other text mining operations, which utilize data mining algorithms, can be performed. For example, in another embodiment the document mining can be clustering of documents to discover categories in the collection. Each of these stages relies upon individual techniques and can be configured with the combination of text processing techniques which is best suited for a particular application. The present invention can be customized, using prior domain knowledge to adjust parameter values of the text processing techniques applied to a particular domain of documents. A user can also adjust the parameters after a data mining operation has taken place to obtain, for example, a more accurate result.

Figure 2:
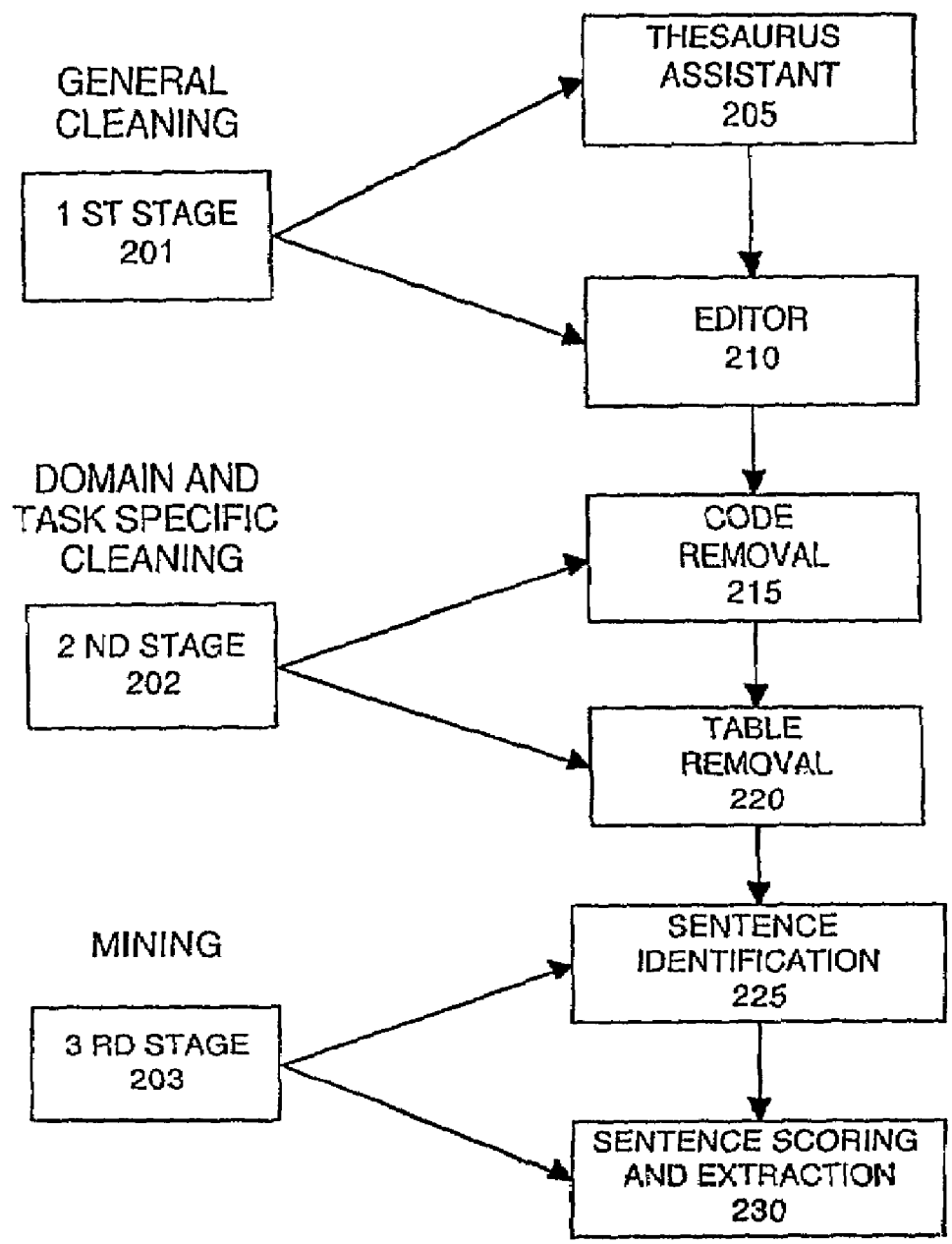
FIG. 2 is a block diagram showing on the left side a general method 200 utilized in embodiments of the present invention and on the right side, a particular embodiment for summarization.
Figure 3:
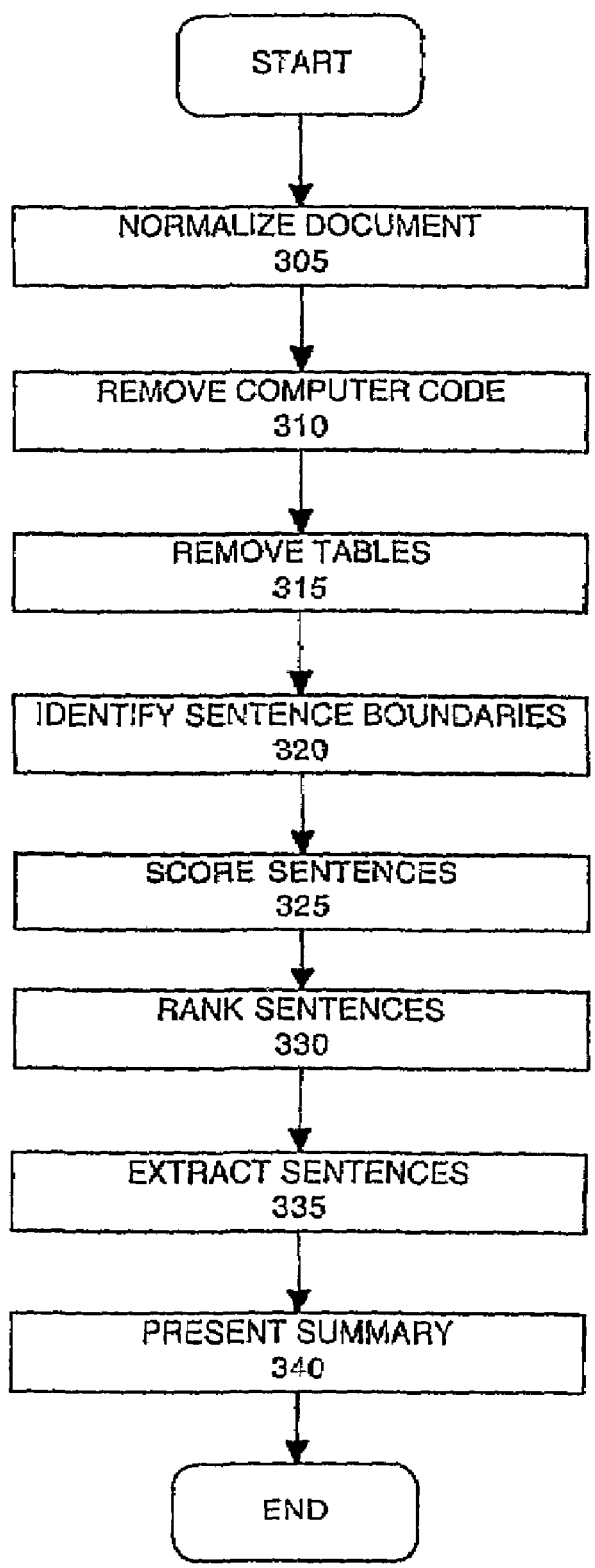
FIG. 3 is a flowchart of a method 300 for preparing and summarizing documents containing dirty text utilized in embodiments of the present invention.

The left side of FIG. 2 is a block diagram showing the general method of a process 200 for mining a document containing dirty text and the right side shows one embodiment of the present invention for summarizing a document containing dirty text as set forth in process 300 of FIG. 3. For purposes of clarity, the following discussion will utilize FIG.

2 in conjunction with process 300 of FIG. 3, to clearly describe one embodiment for summarization of the present invention.

Figure 4:
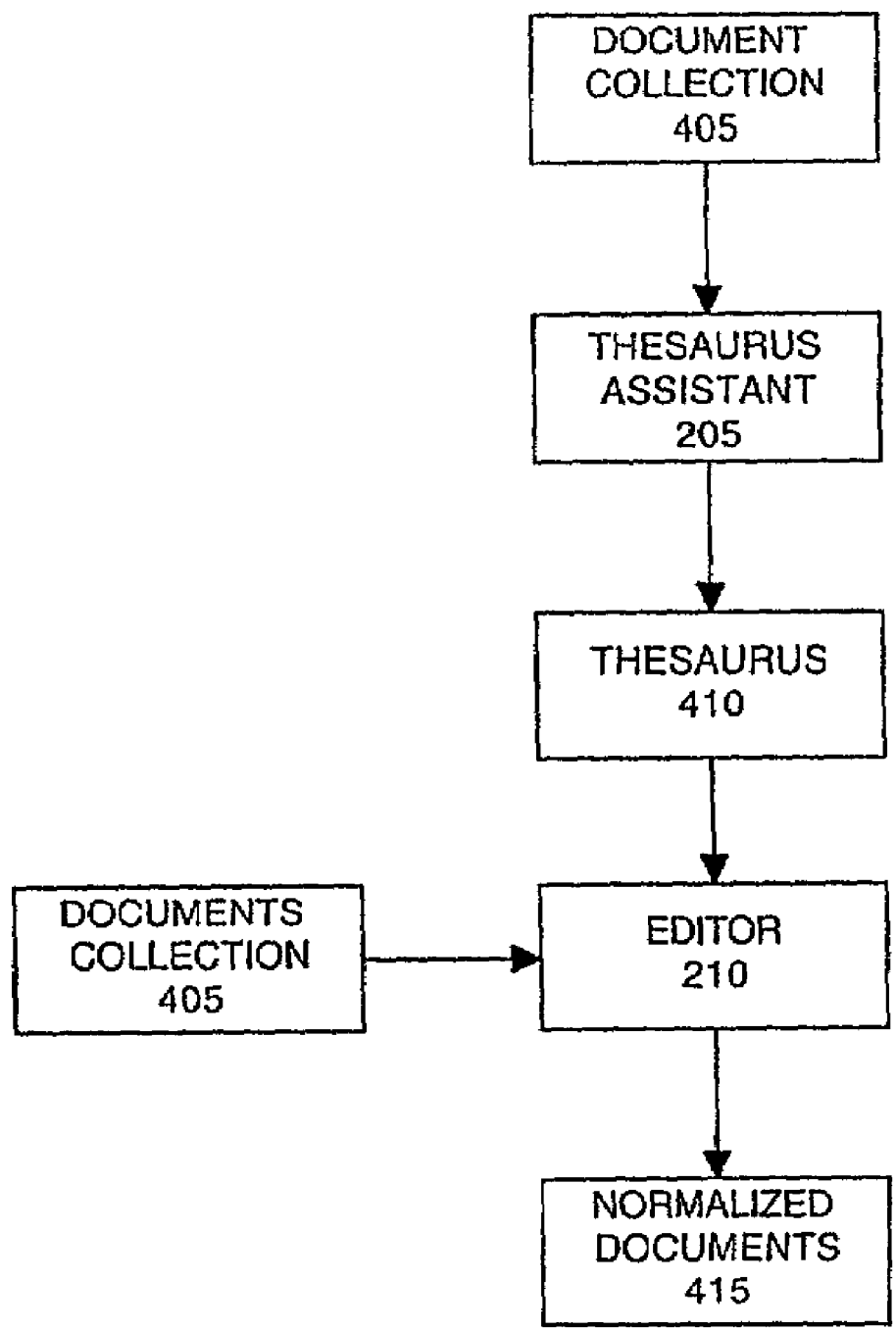
FIG. 4 is a block diagram showing in greater detail the components involved in normalization of documents.

In first stage 201, with reference to FIG. 2 and to step 305 of FIG. 3, a document is normalized. FIG. 4 shows in greater detail the first stage of the present invention and will be referenced in conjunction with FIG. 2. Thesaurus assistant 205 helps in the creation of a thesaurus 410 which contains a list of standard words and their corresponding variations discovered in the document collection 405. Editor 210 inserts a standard term from thesaurus 410 into the documents wherever a corresponding variation of the standard term exists to create normalized documents 415. This removes instances of dirty text in the documents such as misspellings, typographical errors, joined words, and ad hoc abbreviations. This dirty text can inhibit later text mining tasks which may rely on correctly spelled or standardized words or phrases, or on statistics of word occurrence.

As other processing tools become available, they can be readily integrated into the present invention to enhance its functionality. In another embodiment of the present invention, other normalizing techniques may also be included in the general cleaning stage. A natural language normalizer, which could correct instances of poor grammar, is an example of a technique well suited for this stage of cleaning. Using a natural language normalizer would enable the use of summarizing techniques which are not currently utilized because of their reliance upon grammatically correct text. In such a case, natural language techniques could be integrated into other stages as well to take into account linguistic aspects of text.

In second stage 202, with reference to FIG. 2 and to step 310 of FIG. 3, computer code (e.g., computer commands, programming code, and core dumps) and cryptic tables are removed from the document. It is important in a summarizing process that sentences be identified. Instances of computer code and cryptic tables can complicate the task of sentence identification, possibly without adding any value to the summary. Therefore, in step 310 computer code is removed to facilitate sentence boundary identification. This removal can be either temporary or permanent.

Computer code has a signature composed of defining characteristics (e.g., short lines, keywords, and special symbols) which are listed in a file and compared to the documents. These defining characteristics have weights assigned according to their importance in identifying computer code. The special characters and keywords used to identify lines of computer code may be edited to reflect different programming languages or domains. The minimum total weight of a line as well as the minimum number of consecutive code lines required are parameters to code removal module 215. There must be a minimum number of consecutive lines identified as code lines before any line is considered to be a line of computer code. This is due to the assumption that lines of code appear in blocks of lines rather than singly.

In some instances, the computer code contains information that is relevant and should be included in the summary. Therefore, the user has the option of discarding the computer code at this point or re-inserting it into the document after sentence boundaries have been identified. The re-inserted code can be used in the third stage for sentence scoring to help in identifying important themes independently of whether it is included in the summary or not.

Also in second stage 202, with reference to FIG. 2 and to step 315 of FIG. 3, tables are identified and removed from the document. Again, these tables can complicate the task of sentence identification. As with the code line removal, the removal of table lines is based on the signature of a table. Signatures include such things as word clusters on a line of text, the vertical alignment of word clusters on separate lines of text, changes in text density or space density between lines of text, the presence of heading lines, drawing lines used to separate different data elements in the table, and multiple consecutive lines of text with these characteristics.

Removal of table lines is a matter of identifying a minimum number of consecutive lines having these table characteristics. This minimum number of lines, as well as the minimum number of spaces required between groups of words on a line and the minimum number of columns in the table, are all parameters to table removal module 220. After identifying a table, it is removed from the document to facilitate sentence boundary identification in the next stage. As with the step of code removal, the table may be optionally re-inserted into the document after sentence boundaries have been identified if the table contains relevant information (e.g., keywords).

In third stage 203, with reference to FIG. 2 and to step 320 of FIG. 3, sentence boundaries are identified by sentence identifier 225. Sentence identifier 225 is used to delimit what constitutes a sentence in the document in preparation for sentence scoring. Documents containing dirty text are often punctuated ambiguously, have missing punctuation, or are not punctuated at all. Punctuation used for other purposes (e.g., web addresses or product names) can be found within a sentence which further complicates sentence delineation. There may also be a lack of, or non-uniform use of, line breaks and capitalization, which further complicates sentence boundary identification.

The present invention uses a heuristic-based method to identify sentences in a document. The user can examine the document collection and identify common patterns which assist the sentence identifier in delineating sentence boundaries, or use provided defaults. These common patterns are listed in a file which can be edited. Standard punctuation rules are used whenever possible such as sentence-ending punctuation (e.g., periods, question marks, and exclamation points), followed by one or more blanks, followed by a word starting with an upper case letter. When these standard punctuation rules do not apply, other methods such as blank lines indicating the end of a sentence and other formatting characteristics are used. A parameter is also established limiting the maximum number of lines that a sentence may occupy. If that limit is exceeded without finding an end to the sentence, the sentence is ended at the end of a line and a new one is started.

Figure 5:
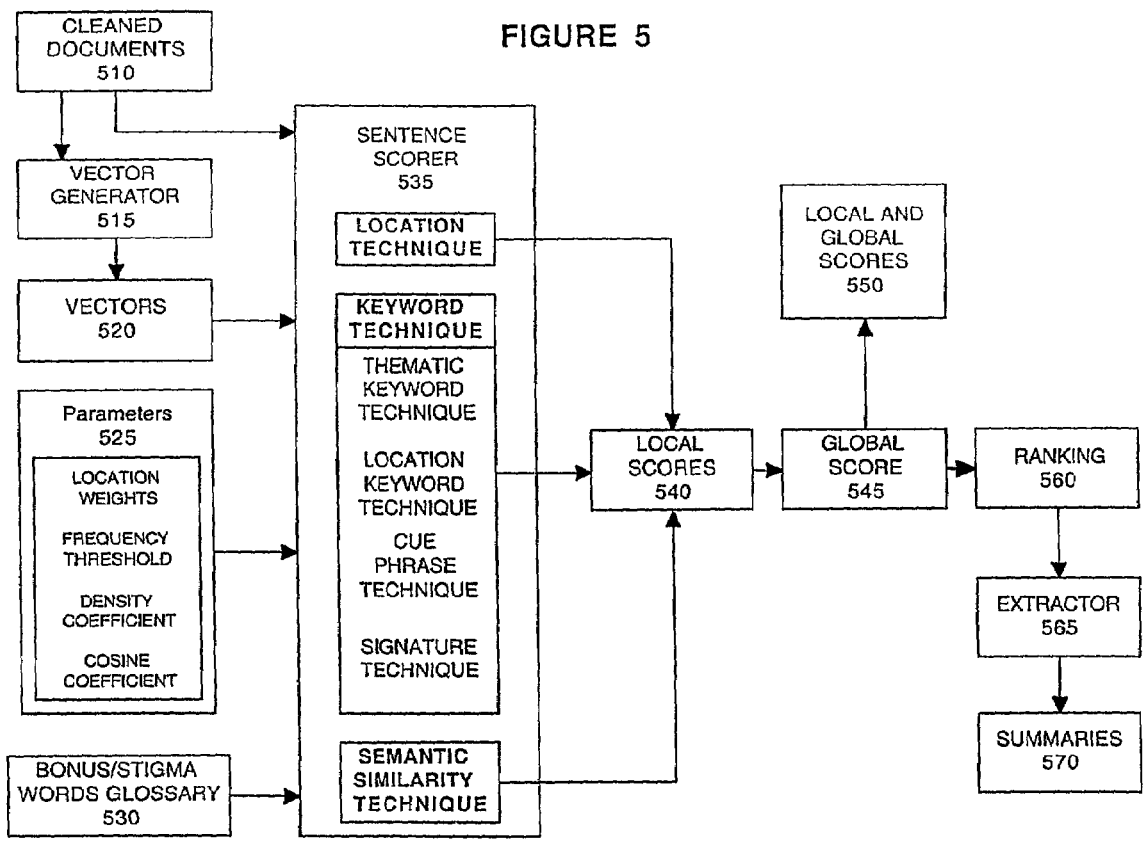
FIG. 5 is a block diagram showing in greater detail the components involved in summarizing documents as embodied by the present invention.

Also in the third stage with reference to FIG. 2 the documents are summarized. Referring to FIG. 5 which illustrates sentence summarization, once the sentence boundaries have been identified, the cleaned documents 510 are sent to the sentence scorer 535 to score the sentences prior to ranking and summarization. It should be noted that in the present embodiment, the cleaned documents no longer contain dirty text but may contain incorrect grammar as the present embodiment does not correct grammatical errors. In another embodiment, natural language techniques can be applied which address the incorrect use of grammar. Sentence scorer 535 outputs sentences scored according to their relevance.

There are different aspects of a sentence that are indicative of its relevance. However, unless the document contains grammatically correct and narrative text, the choice of sentence scoring techniques available is limited. The present invention incorporates scoring techniques that are applicable to documents lacking those characteristics based on a careful analysis of all available techniques. However, these scoring techniques are equally applicable to documents containing grammatically correct and narrative text. The individual scoring techniques adopt different criteria and establish different metrics to score the relevance of a sentence. The keywords in a sentence, the correlation between sentences, and the location of the sentence within the document are complementary aspects that are used for assessing the relevance of a sentence.

Referring again to FIG. 5, according to parameters 525 set by the user, each summarizing technique independently evaluates a sentence and gives it a local score 540. The local scores are each given a weight of importance and combined to create a global score 545. If a particular summarizing technique is found to be more effective in identifying relevant sentences in a given domain of documents, it may be given a higher weight of importance. A sentence with a higher global score is considered more relevant and given a higher ranking 560. The highest ranked sentences are extracted 565 and presented to the user as a summary 570.

One of the techniques used for scoring sentences is based on the presence of keywords in the sentence. It is assumed that sentences that have more instances of keyword occurrence are more likely to convey the relevant themes of a document. The keyword technique generates a keyword glossary which assigns weights of importance to each word identified as a keyword. Keywords that are identified by more than one technique are given higher weight. Once a document has been analyzed and the keywords identified, each sentence is scored according to the keywords it contains. Parameters can be adjusted to give sentences with a greater keyword density or frequency a higher score. The sentences are scored according to the frequency, weight, and density of keywords in them.

Embodiments of the present invention use a combination of techniques to generate the keyword list. The thematic keyword technique is a document specific keyword generating technique based on the frequency of occurrence of words in the document. Words in the document are compared to a stop word list comprised of words regarded as irrelevant to the current domain. Words from the document that are on the stop word list are disregarded when analyzing the word frequency of a document. From remaining words, those that occur more frequently in the text are assumed to be more important in conveying the relevant theme of the document and are placed on the keyword list. The user may adjust the frequency threshold to make the keyword glossary more inclusive or exclusive as necessary. For example, if the user found it necessary to find more keywords, lowering the frequency threshold would include more words in the keyword glossary.

The location keyword technique generates keywords utilizing prior knowledge of the document structure to identify important sections and give keywords from these sections greater weight. Certain sections of the document (e.g., the introduction and the conclusion) can be identified by the user as being more likely to contain relevant information. The location keyword technique gives keywords identified in these sections greater weight than those from other sections and can assign to each section its own weight of importance. For example, keywords from the introduction can be assigned greater weight than keywords from the conclusion. Lacking any prior knowledge of the structure of the document, the location keyword technique does not have to be used.

Keywords can also be provided by the user in the form of cue phrases. These are held in a glossary of bonus/stigma words 530. For example, a user who considers technical information to be relevant can identify technical words as bonus words which will give a sentence containing these words a greater score. The same user can also identify stigma words which are indicative of non-relevance and that, if found in a sentence, give that sentence a lower score. Again, prior domain knowledge can be leveraged by the user to obtain a more accurate sentence scoring.

One other technique used to generate keywords relies on the signature of documents that have been previously categorized. Each category of documents has signature keywords that describe the characteristics of that category. For example, a category called computer might have keywords of memory, processor, and motherboard. These keywords can be generated by any of a number of different feature selection techniques for determining the characteristics of categorized documents. In one embodiment, the chi-square statistical technique is used to evaluate the association between words and categories. If a sentence contains signature words, it is given a higher score.

As previously stated, using these techniques, the keyword list is generated as well as a list of weights associated with the keywords. This allows the user to evaluate, for a given domain, which techniques are most effective in generating keywords, allowing the user to give keywords generated by the more effective techniques greater weight. Keywords identified by more than one technique can be given a greater weight than words identified by only one technique. The user can also adjust the frequency threshold and density coefficient parameters of the sentence scorer. Once a document has been analyzed and the keywords identified, each sentence is assigned a local score according to the frequency, weight, and density of keywords it contains.

Another technique for scoring sentences analyzes the location of the sentence itself to assign a local score. This is to be distinguished from the location keyword technique which gave keywords in certain sections greater weight. This location technique assigns a local score to a sentence as a whole depending on its location in the document. Relevant sections are identified and sentences that are contained in those sections are scored higher. The sentence can get a higher score depending on what section of the document the sentence is in, what paragraph in the section the sentence is in, and the location of the sentence within the paragraph. It is appreciated that prior domain knowledge is needed to identify the important sections in the document. However, if there is no prior knowledge of the document, this method will still work as certain paragraphs (e.g., first and last) and sentence locations within a paragraph (e.g., the first and last sentences of a paragraph) will be given a higher score as a default value. A parameter set by the user indicates which of these options will be used.

One other technique utilized by the sentence scorer to assign a local score is based on the semantic similarity of sentences. A sentence is considered more relevant if it is semantically related to a larger number of other sentences in the document. The semantic similarity method compares vectors of sentences to determine the semantic similarity of the sentences. Sentences are considered semantically related only if they exceed a threshold based upon the cosine of the angle between the vectors.

Referring to FIG. 5, cleaned sentences are sent to vector generator 515. Each sentence is then represented as a vector using selected words as features or dimensions which will be used to generate the vectors 520. The keyword glossary can also be used to provide dimensions for the vector representation of sentences. Each vector is compared to every other vector in the document to determine the similarity between the sentences. The cosine of the angle between two vectors is used to determine whether two vectors are sufficiently similar. The smaller the angle between two given vectors is, the greater the similarity between the sentences. If the similarity between two vectors is large enough to be regarded as non-random, the vocabulary matches between the corresponding sentences are considered meaningful and the two sentences are semantically related. However, the user may change the threshold depending on the domain be evaluated. For every semantic similarity that exceeds the threshold set by the user, a semantic link is established. Sentences with more semantic links are considered more relevant and given a higher score.

Referring to FIG. 5 and to step 325 of FIG. 3, the sentences are scored. The output from each of the summarization techniques (the keyword technique, the location technique, and the semantic similarity technique) is an independent local score 540. The local scores are given weights which can be adjusted by the user to give more effective techniques greater weight. These local scores are then combined to create a global score 545. The global score is used to rank the sentences in a document.

Referring to FIG. 5 and to step 330 of FIG. 3, the sentences are ranked. The sentences are ranked according to the global scores they received from the sentence scorer. The sentence with the highest global score receives the highest ranking followed in descending order by the rest of the sentences in the document.

Referring to FIG. 5 and to step 335 of FIG. 3, using extractor 565, the sentences are extracted according to the ranking of the sentences and user parameters determining how many sentences will be presented. The user can determine a compression level which is a percentage of the entire document (e.g., 20% of the entire document) or the user can set a number of sentences which will comprise the summary.

The user also sets parameters determining how the summary will be presented. The summary can be in the form of an extract or excerpt containing the most relevant sentences in the order they appear in the document and an appended numerical ranking of each sentence according to its relevance. Referring still to FIG. 5, the user can receive an extract 550 which shows the sentences appended with their respective local and global scores. This is a useful tool for the user to determine the effectiveness of the sentence scoring techniques. For example, the user can pick an important sentence in a document and compare the local scores to determine which technique most effectively identified the sentence as being important. Using this information, the user can give this particular technique greater weight in deriving the global scores, thus increasing the accuracy of the summarizer.

The summary can also be in the form of a highlighted version of the document. The entire document is presented with the most relevant sentences highlighted. The highlighted sentences can be appended with their numerical ranking as well. The user can also be presented with both an excerpt and highlighted version.

Referring to FIG. 5 and to step 340 of FIG. 3, a summary of ranked sentences is presented to the user. This summary can be filed, printed, or displayed on the user's computer.

Thus, the present invention provides a method and system to mine documents containing dirty text such as typographical errors, misspellings, joined words, ad hoc abbreviations, cryptic tables, programming code, and core dumps, in addition to bad grammar and haphazard punctuation. It also provides a method and system for summarizing documents containing dirty text that can be easily customized and takes advantage of existing domain knowledge.

The preferred embodiment of the present invention, a method and system for mining a document containing dirty text, is thus described. While the present invention has been described in particular embodiments, it should be appreciated that the present invention should not be construed as limited by such embodiments, but rather construed according to the following claims.

What is claimed is:

1. A computer-implemented method for mining a document containing dirty text comprising:
    removing an instance of dirty text within said document to produce a cleaned document having a content; and
    performing a data mining operation on said cleaned document thereby deriving relevant information from said cleaned document and providing a summary of the content of said document, and scoring and ranking each sentence of said document, wherein said removing further comprises removing an instance of computer code from said document, and removing a table from said document.

2. The method for mining a document containing dirty text as recited in claim 1, wherein said removing further comprises replacing an instance of dirty text with a standard term.

3. The method for mining a document containing dirty text as recited in claim 1, wherein said performing a data mining operation further comprises identifying a sentence within said cleaned document by identifying a beginning and an end of said sentence.

4. The method for mining a document containing dirty text as recited in claim 3, wherein said performing a data mining operation further comprises scoring and ranking said sentence.

5. The method for mining a document containing dirty text as recited in claim 4, wherein said method further comprises generating a summary derived from said scored and ranked sentences.

6. The method for mining a document containing dirty text as recited in claim 4, wherein said method further comprises selecting a text mining component based upon said data mining operation to be performed.

7. The method for mining a document containing dirty text as recited in claim 4, wherein said method further comprises customizing said method by adjusting a parameter value.

8. A computer system comprising:
    a bus;
    a memory unit coupled to said bus; and
    a processor coupled to said bus, said processor for executing a method for mining a document containing dirty text comprising:
    producing a cleaned document having a content comprising performing a general cleaning of said document by removing an instance of dirty text within said document including instances of misspelling and grammatical errors, and performing a domain and task specific cleaning of said document including removing instances of computer code and tables to produce a cleaned document; and
    performing a data mining operation on said cleaned document including providing a summary of the content of said document including scoring and ranking each sentence.

9. The computer system as recited in claim 11, wherein said removing further comprises replacing an instance of dirty text with a standard term.

10. The computer system as recited in claim 8, wherein said performing a data mining operation further comprises identifying a sentence within said cleaned document by identifying a beginning and an end of said sentence.

11. A computer system comprising:
a bus;
a memory unit coupled to said bus; and
a processor coupled to said bus, said processor for executing a method for mining a document containing dirty text comprising:
producing a cleaned document having a content comprising performing a general cleaning of said document by removing an instance of dirty text within said document including instances of misspelling and grammatical errors, and performing a domain and task specific cleaning of said document including removing instances of computer code and tables to produce a cleaned document; and
performing a data mining operation on said cleaned document including providing a summary of the content of said document, wherein said performing a data mining operation further comprises identifying a sentence within said cleaned document by identifying a beginning and an end of said sentence, wherein said performing a data mining operation further comprises scoring and ranking said sentence and wherein scoring said sentence further comprises:
selecting scoring techniques operable for summarizing non-narrative, grammatically incorrect text;
selecting scoring techniques operable for summarizing narrative, grammatically correct text; and
using said scoring techniques to score said sentence.

12. The computer system as recited in claim 11, wherein said method further comprises generating the summary derived from said scored and ranked sentences.

13. The computer system as recited in claim 11, wherein said method further comprises selecting a text mining component based upon said data mining operation to be performed.

14. The computer system as recited in claim 11, wherein said method further comprises customizing said method by adjusting a parameter value.

15. A computer-useable medium having computer-readable program code embodied therein for causing a computer system to perform the steps of:
removing an instance of dirty text within said document to produce a cleaned document having a content; and
performing a data mining operation on said cleaned document to provide a summary of said content, removing an instance of computer code from said document and removing a table from said document, and scoring and ranking each sentence.

16. The computer-useable medium of claim 15, wherein said removing further comprises replacing an instance of dirty text with a standard term.

17. The computer-useable medium recited in claim 15, wherein said performing a data mining operation further comprises identifying a sentence within said cleaned document by identifying a beginning and an end of said sentence.

18. A computer-useable medium having computer-readable program code embodied therein for causing a computer system to perform the steps of:
removing an instance of dirty text within said document to produce a cleaned document having a content; and
performing a data mining operation on said cleaned document to provide a summary of said content, wherein said performing a data mining operation further comprises identifying a sentence within said cleaned document by identifying a beginning and an end of said sentence, wherein said performing a data mining operation further comprises, wherein scoring said sentence further comprises:
selecting scoring techniques operable for summarizing non-narrative, grammatically incorrect text;
selecting scoring techniques operable for summarizing narrative, grammatically correct text; and
using said scoring techniques to score said sentence.

19. The computer-useable medium recited in claim 18, wherein said method further comprises generating a summary derived from said scored and ranked sentences.

20. The computer-useable medium as recited in claim 18, wherein said method further comprises selecting a text mining component based upon said data mining operation to be performed.

21. The computer-useable medium as recited in claim 18, wherein said method further comprises customizing said method by adjusting a parameter value.

22. A computer-implemented method for mining a document containing dirty text comprising:
producing a cleaned document having a content comprising performing a general cleaning of said document by removing one or more instance of dirty text within said document including instances of misspelling and grammatical errors, and performing a domain and task specific cleaning of said document including removing instances of computer code and tables; and
performing a data mining operation on said cleaned document, including determining a sentence score for each sentence of said cleaned document and ranking the sentences from highest to lowest based on the sentence score;
generating a summary of the content of the document using the highest ranked sentences.

23. The method of claim 22, wherein determining a sentence score for each sentence includes applying a keyword technique to each sentence.

24. The method of claim 23, wherein determining a sentence score further comprises applying a location technique to each sentence.

25. The method of claim 23, wherein determining a sentence score further comprises applying a semantic similarity technique to each sentence.

26. The method of claim 25, wherein the semantic similarity technique comprises:
generating a vector associated with each sentence; and
comparing each vector to every other vector, including defining a cosine of an angle between two vectors and using the cosine of the angle between two vectors to determine whether sentences represented by the two vectors are semantically related.

* * * * *